Dec. 10, 1968   W. A. SEUBERT   3,415,581
SHAFT SEAL
Filed June 16, 1967
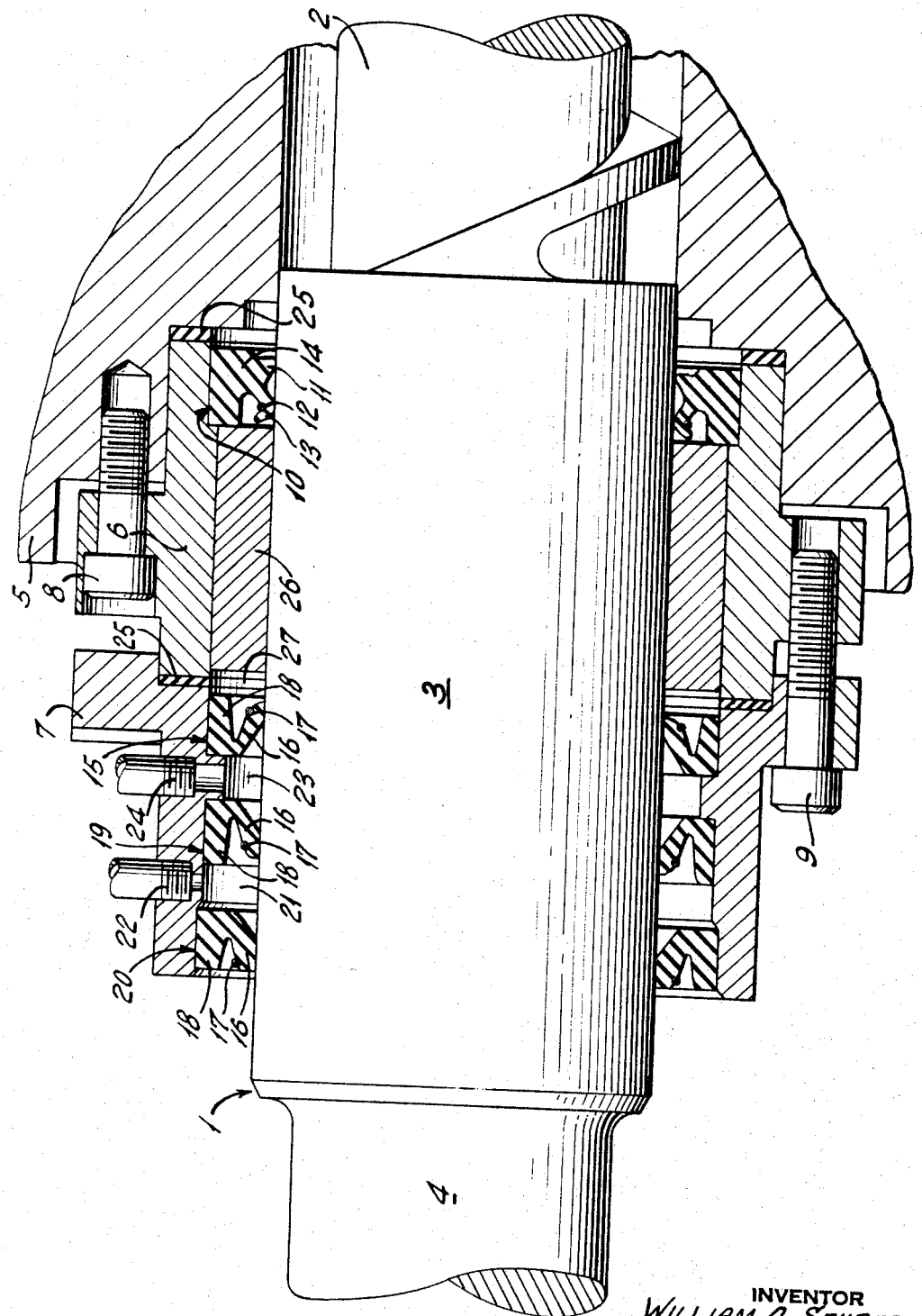
INVENTOR
WILLIAM A. SEUBERT
BY
ATTORNEY United States Patent Office 3,415,581
Patented Dec. 10, 1968

3,415,581
SHAFT SEAL
William A. Seubert, Belle Meade, N.J., assignor to Union Carbide Corporation, a corporation of New York
Filed June 16, 1967, Ser. No. 646,544
4 Claims. (Cl. 308—36.3)

ABSTRACT OF THE DISCLOSURE

Shaft seal including a shaft and a surrounding housing having disposed therebetween a bearing in which the shaft is journalled, a spring loaded seal on one side of the bearing and three spring loaded seals on the other side of the bearing spaced apart and defining a vacuum chamber and a lubrication chamber between adjacent seals.

Background

This invention relates to a shaft seal adapted for use on the rear shank of an extrusion screw in extrusion apparatus equipped with a vacuum stock infeed device.

Fine granular polymeric materials such as polyvinyl chloride are extruded into sheet and film in extrusion apparatus equipped with a vacuum stock infeed device. Suitable apparatus is shown in U.S. Patent 3,177,527, issued Apr. 13, 1965. It has been found, however, that the seal on the rear shank of the extrusion screw is extremely difficult to maintain.

Prior seals have been found to fail after relatively short periods of use which causes a break in the vacuum and leads to stagnation of the polymeric material in the infeed device and a break in the extrusion feed. This failure requires shutdown of the extrusion apparatus and replacement of the seal or seals and, eventually, replacement of the bearing.

Summary

This invention provides a shaft seal which overcomes the problems met with prior seals and permits continuous operation of extrusion apparatus equipped with a vacuum stock infeed device for long periods of time without breaks in the vacuum.

The shaft seal of this invention comprises a shaft and a housing surrounding said shaft and therebetween:

(1) A first seal comprising a relatively hard heel portion in contact with the housing and a spring loaded flexible lip in sealing contact with the shaft;

(2) A bearing in which the shaft is journalled;

(3) Second, third and fourth seals spaced apart each comprising a relatively hard heel portion in contact with the housing and a spring loaded flexible lip in sealing contact with the shaft;

(4) An adjacent pair of the second, third and fourth seals defining a vacuum chamber which is connected to a source of vacuum; and (5) The second adjacent pair of the second, third and fourth seals defining a lubrication chamber which is in communication with a lubrication inlet in the housing.

The drawing comprises a single figure, partly in cross-section, showing a preferred seal of the invention on the rear shank of an extrusion screw.

Description

Referring now to the drawing, reference numeral 1 designates an extrusion screw having a conveying or feeding portion 2, a rear shank or shaft 3 and a rearward extension 4 which is adapted for connection with a power drive (not shown). Surrounding shank 3 are housings 6 and 7. Housing 6 is mounted on feed block 5 by means of cap screws 8 and housing 7 is mounted on 6 by means of cap screws 9. If desired housings 6 and 7 can be made as one piece and would be mounted on feed block 5 by suitable means. Feed block 5 is a component of conventional extrusion apparatus on which is mounted a vacuum stock infeed device (not shown) and an extrusion cylinder (not shown) such as is disclosed in U.S. Patent 3,177,527, cited above.

Air tight seals between housings 6 and 7 and between housing 6 and feed block 5 are provided by circular gaskets 25 made of rubber or similar resilient material.

Shank 3 is journalled in bearing 26 contained within housing 6 and is generally made of a long-wearing metal such as bronze.

Forward of bearing 26 is a first seal 10 which is shown to include a relatively hard heel portion 14, in contact with housing 6, flexible lip 11 and spring loaded flexible lip 13 which is urged into sealing contact with shank 3 by means of coil spring 12. Rearward of bearing 26 are seals 15, 19, and 20 spaced apart and each including a relatively hard heel portion 18 in contact with housing 7 and spring-loaded, flexible lips 16 which are urged into sealing contact with shank 3 by means of coil spring 17.

Seals 10, 15, 19 and 20 are generally made from a combination of polymeric materials depending on the sealing requirements. For example, the relatively hard heel portions can be made from hard or rigid asbestos filled rubber compositions and can be metal reinforced if desired. The flexible lips, on the other hand, are more resilient to provide for good sealing and can be made from rubber or synthetic polymeric materials. These seals are well known and are commercially available.

Seals 15 and 19 define a circular vacuum chamber 23 in conjunction with shank 3 and housing 7. Chamber 23 is connected to a vacuum source (not shown) by means of port 24. Seals 19 and 20 define a circular lubrication chamber 21 in conjunction with shank 3 and housing 7. Chamber 21 is in communication with inlet port 22 through which a suitable lubricant is fed. Chambers 21 and 23 can be interchanged if desired but are preferably as shown in the drawing.

Seals 10, 15, 19 and 20 are preferably positioned as shown in the drawing to provide for maximum sealing. For instance, lip 13 of seal 10 is positioned to flex toward bearing 26 so that a vacuum surrounding the conveying section 2 of the extrusion screw which is caused by vacuum stock infeed device (not shown) tends to cooperate with coil spring 12 to maintain lip 13 in sealing contact with shank 3. Seals 15 and 19 are positioned to flex away from vacuum chamber 23 for the same reason.

Modifications can be made in this invention without departing from the spirit thereof. For example, the circular chamber 27 between bearing 26 and seal 15 can be provided with a lubrication port to make chamber 27 a lubrication chamber if desired.

Thus it is readily appreciated that bearing 26, seals 10, 15, 19 and 20, lubrication chamber 21 and vacuum chamber 23 cooperate to provide an effective, long lasting vacuum seal as compared to prior seals.

What is claimed is:

1. Shaft seal adapted for use on the rear shank of an extrusion screw in extrusion apparatus equipped with a vacuum stock infeed device comprising a shaft and a housing surrounding said shaft and therebetween:

(1) a first seal comprising a relatively hard heel portion in contact with said housing and a spring loaded flexible lip in sealing contact with said shaft;
   (2) a bearing in which said shaft is journalled;
   (3) second, third and fourth seals spaced apart each comprising a relatively hard heel portion in contact with said housing and a spring loaded flexible lip in sealing contact with said shaft;
   (4) one adjacent pair of said second, third and fourth seals defining a vacuum chamber which is connected to a source of vacuum; and (5) the second adjacent pair of said second, third and fourth seals defining a lubrication chamber which is in communication with a lubrication inlet in said housing.

2. Shaft seal of claim 1 wherein said bearing and said second seal define a lubrication chamber which is in communication with a lubrication inlet in said housing.

3. Shaft seal of claim 1 wherein said first seal includes a flexible lip in sealing contact with said shaft.

4. Shaft seal of claim 1 wherein said shaft is the rear shank of an extrusion screw and said first seal, said bearing and said second, third and fourth seals are in sequence from the screw end of said shank.

No references cited.

MARTIN P. SCHWADRON, *Primary Examiner.*

FRANK SUSKO, *Assistant Examiner.*